United States Patent
Schaper et al.

(10) Patent No.: US 8,657,992 B2
(45) Date of Patent: Feb. 25, 2014

(54) METHOD AND APPARATUS FOR LAYER BONDING OF DISPLAY ASSEMBLY

(75) Inventors: Peter Schaper, Candler, NC (US); Ralf Horstkemper, Asheville, NC (US); Julio Rodriguez-Ramos, Asheville, NC (US)

(73) Assignee: ODBond, LLC, Alpharetta, GA (US)

( * ) Notice: Subject to any disclaimer, the term of this patent is extended or adjusted under 35 U.S.C. 154(b) by 286 days.

(21) Appl. No.: 13/000,787

(22) PCT Filed: Jun. 25, 2009

(86) PCT No.: PCT/US2009/048618
§ 371 (c)(1),
(2), (4) Date: Mar. 24, 2011

(87) PCT Pub. No.: WO2009/158474
PCT Pub. Date: Dec. 30, 2009

(65) Prior Publication Data
US 2011/0168328 A1   Jul. 14, 2011

Related U.S. Application Data

(60) Provisional application No. 61/076,456, filed on Jun. 27, 2008, provisional application No. 61/114,682, filed on Nov. 14, 2008.

(51) Int. Cl.
*C09J 5/00* (2006.01)
(52) U.S. Cl.
USPC ........................ 156/305; 156/99; 156/295

(58) Field of Classification Search
USPC ............ 156/87, 99, 291, 295, 305, 578; 118/313, 315, 316; 427/286; 445/24, 445/25; 264/261, 262
See application file for complete search history.

(56) References Cited

U.S. PATENT DOCUMENTS

| 3,075,870 A | * | 1/1963 | Hedler et al. | 264/262 |
| 4,420,510 A | * | 12/1983 | Kunkel et al. | 427/208.2 |
| 4,470,858 A | * | 9/1984 | McMaster | 156/103 |
| 4,760,961 A | * | 8/1988 | Nagai | 239/267 |

(Continued)

FOREIGN PATENT DOCUMENTS

| JP | 03195789 A | * | 8/1991 |
| JP | 09-266232 | | 10/1997 |

(Continued)

OTHER PUBLICATIONS

Machine translation of JP 2006138897 date unknown.*

*Primary Examiner* — John Goff
(74) *Attorney, Agent, or Firm* — Polster, Lieder, Woodruff & Lucchesi, L.C.

(57) ABSTRACT

A method and apparatus for the bonding of one or more material layers to a display panel which yields a resulting bonded assembly which is transparent and substantially free of optical defects such as entrapped dirt and air bubbles. During the bonding process of the present disclosure, a moving dispensing probe, or needle, dispenses a liquid bonding material into an air gap between the surfaces to be bonded in a manner which continuously touches (wets) each surface simultaneously. By simultaneously wetting each surface, and by dispensing the liquid bonding material in a predetermined pattern between the surfaces, the introduction of entrapped dirt and the formation of air bubbles is prevented as the two mating surfaces are subsequently pressed together and the adhesive is cured.

15 Claims, 10 Drawing Sheets

(56) References Cited

U.S. PATENT DOCUMENTS

| | | | | |
|---|---|---|---|---|
| 5,250,145 A | * | 10/1993 | Despins et al. | 156/578 |
| 7,063,758 B2 | * | 6/2006 | Sakayori et al. | 156/87 |
| 2004/0130788 A1 | | 7/2004 | Minami | |

FOREIGN PATENT DOCUMENTS

| | | | |
|---|---|---|---|
| JP | 2001-138411 | | 5/2001 |
| JP | 2004-224855 | | 8/2004 |
| JP | 2006138897 A | * | 6/2006 |

* cited by examiner

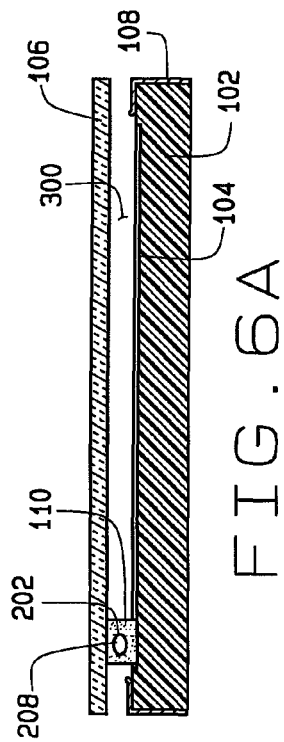
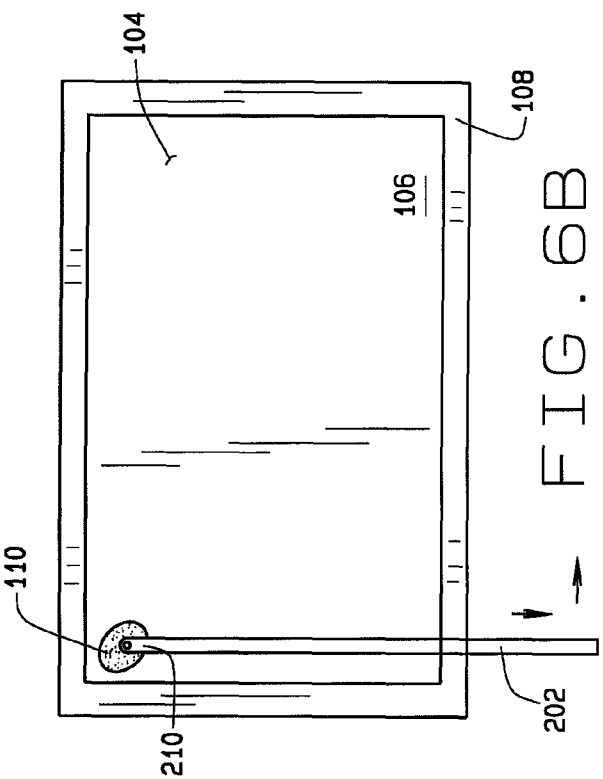
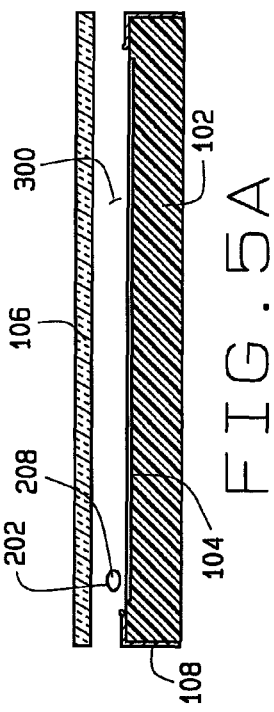
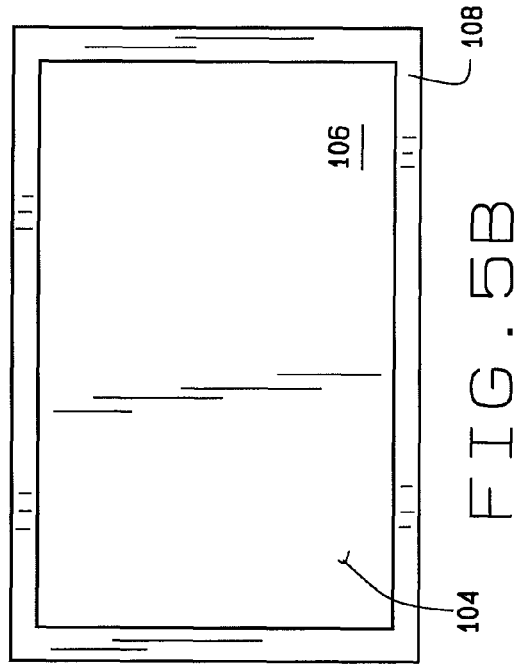

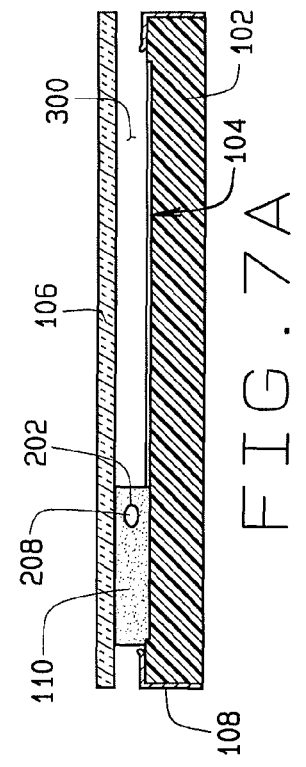
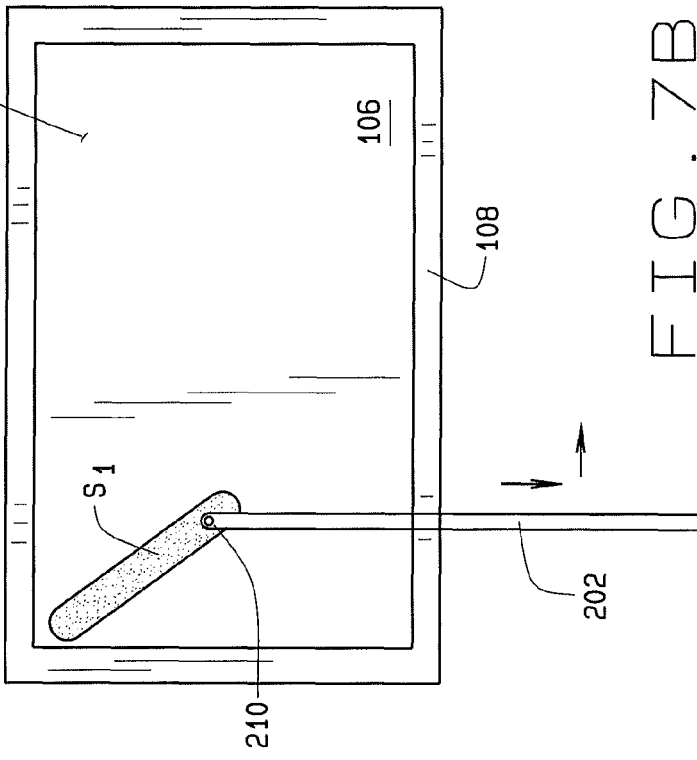
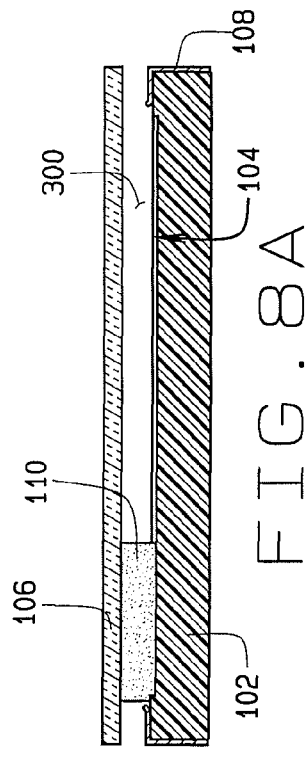
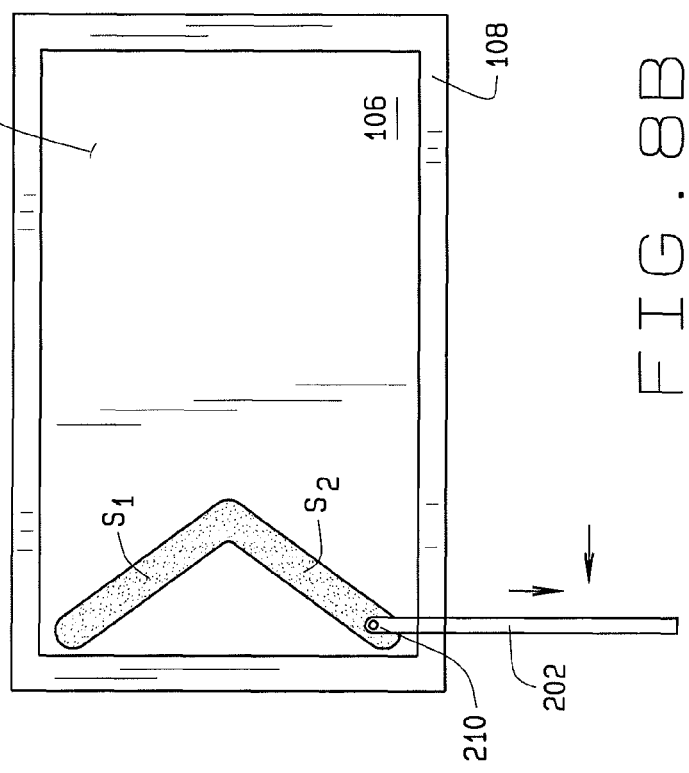

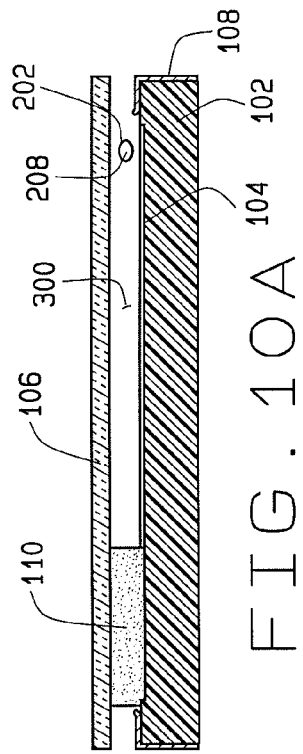
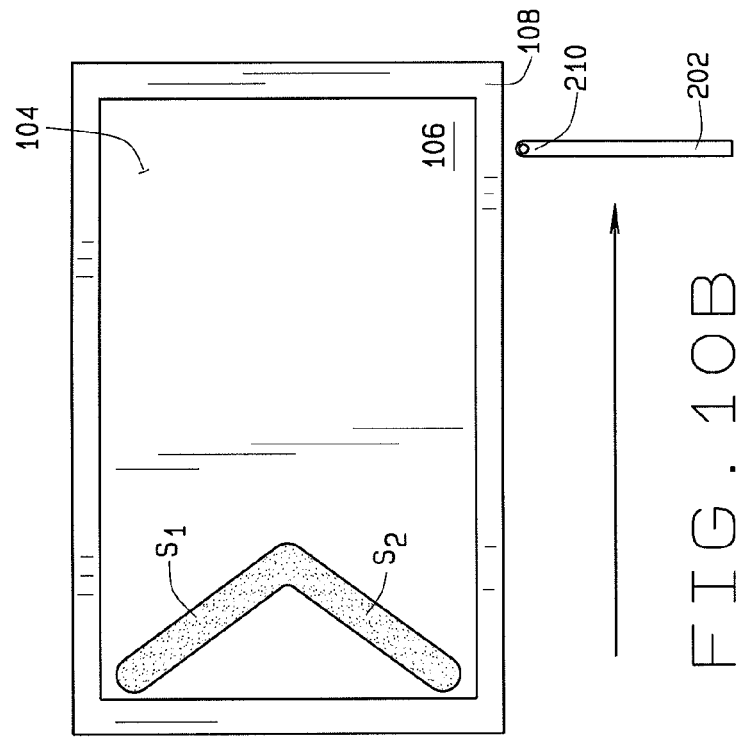
FIG.10A
FIG.10B
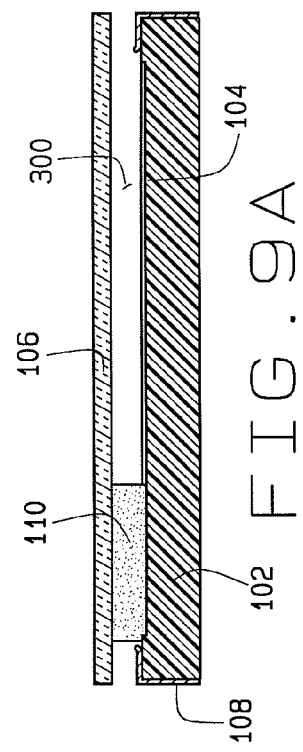
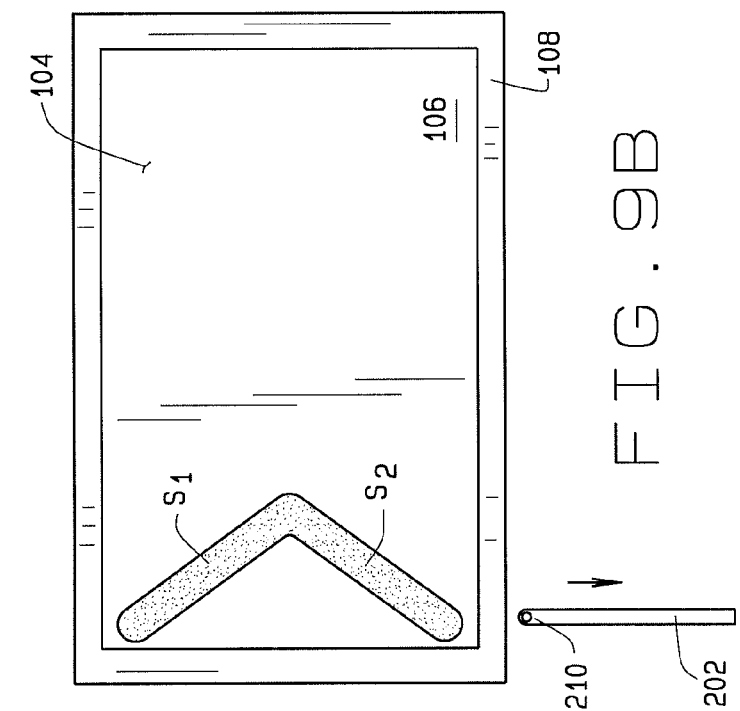
FIG.9A
FIG.9B

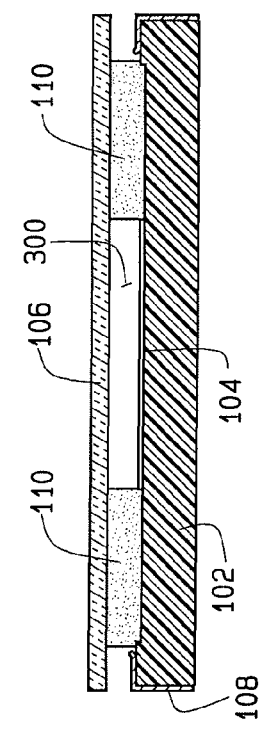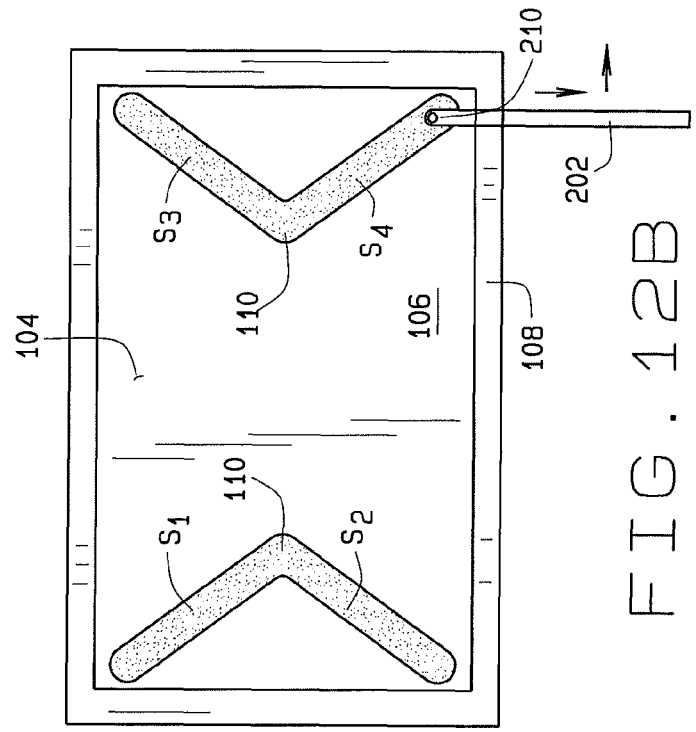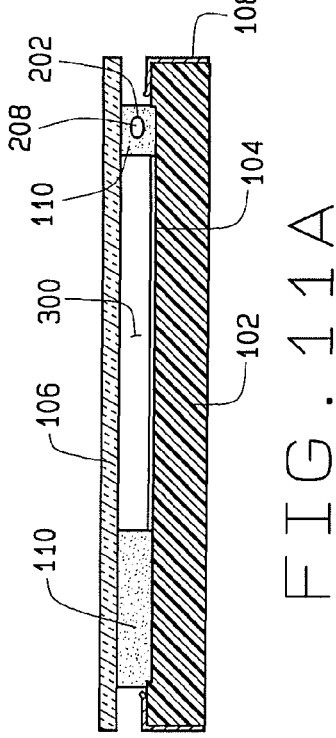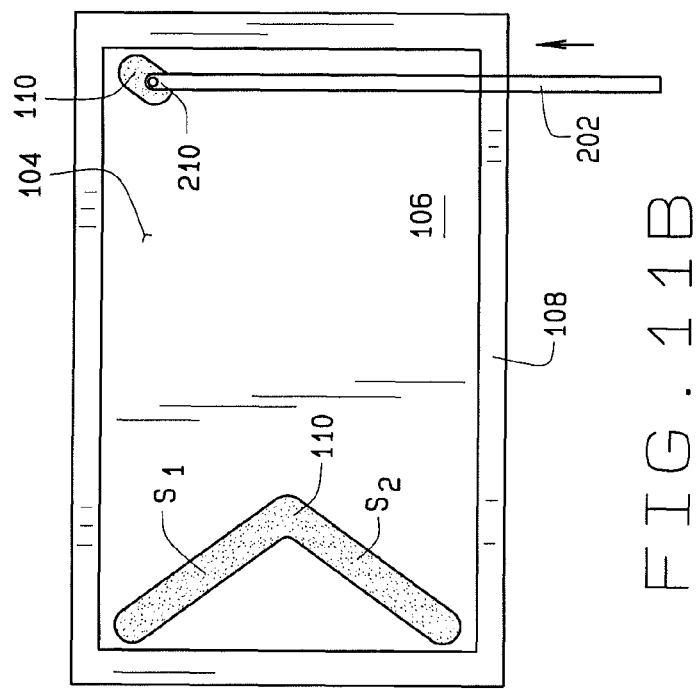

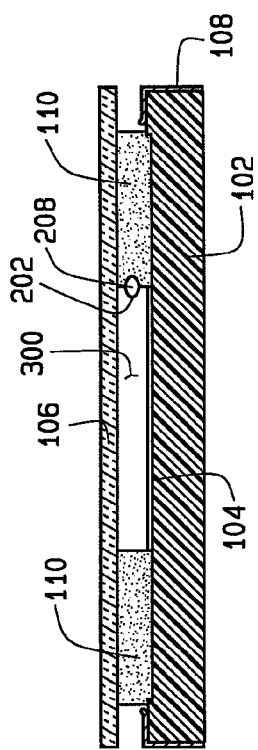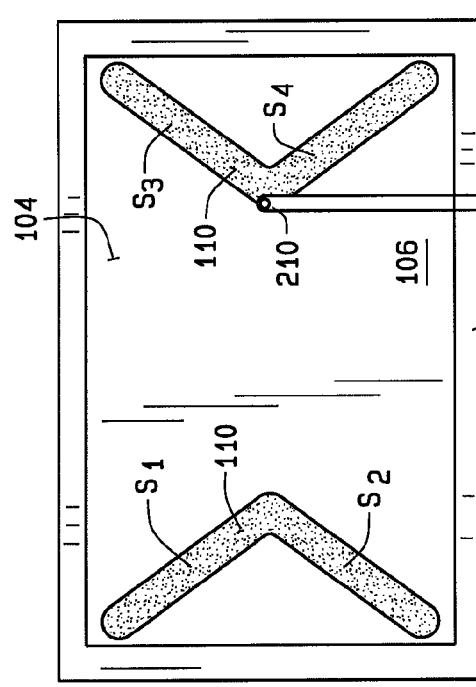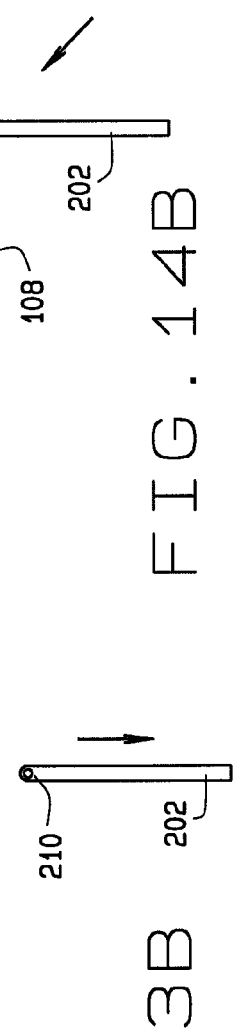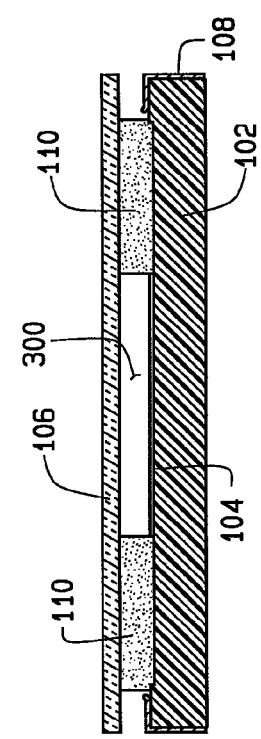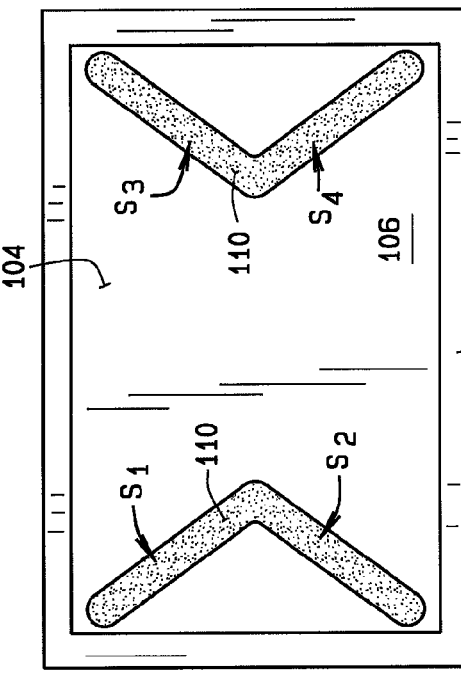

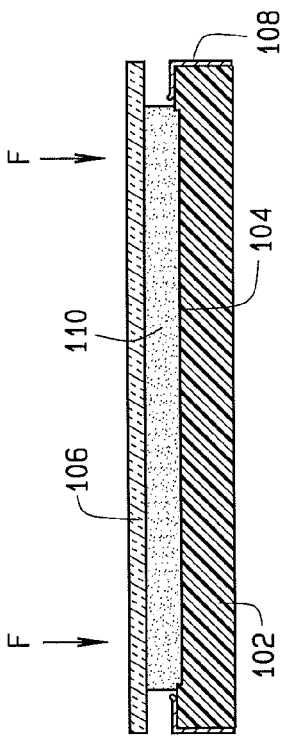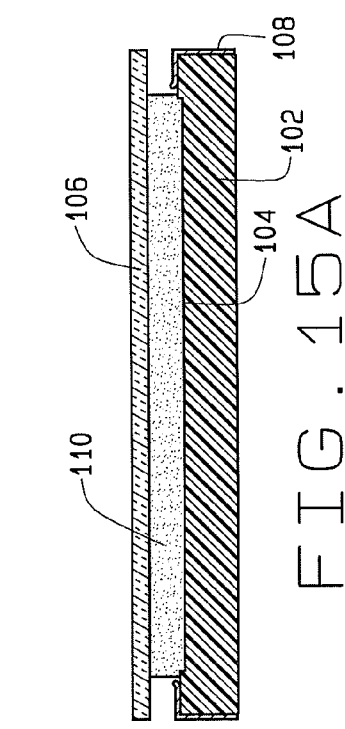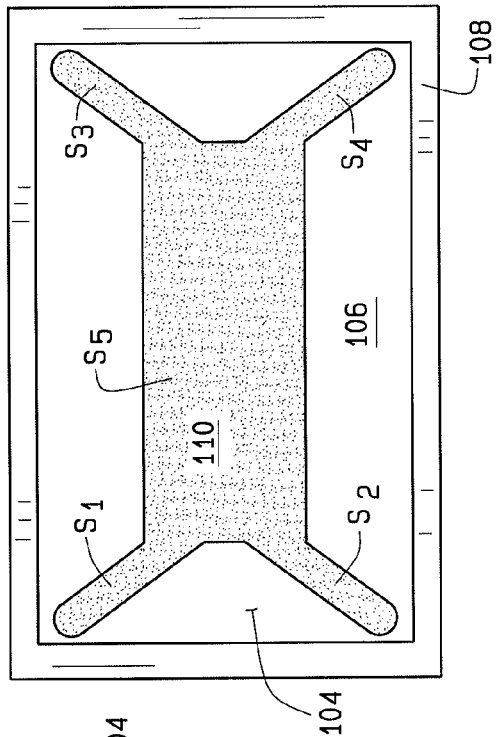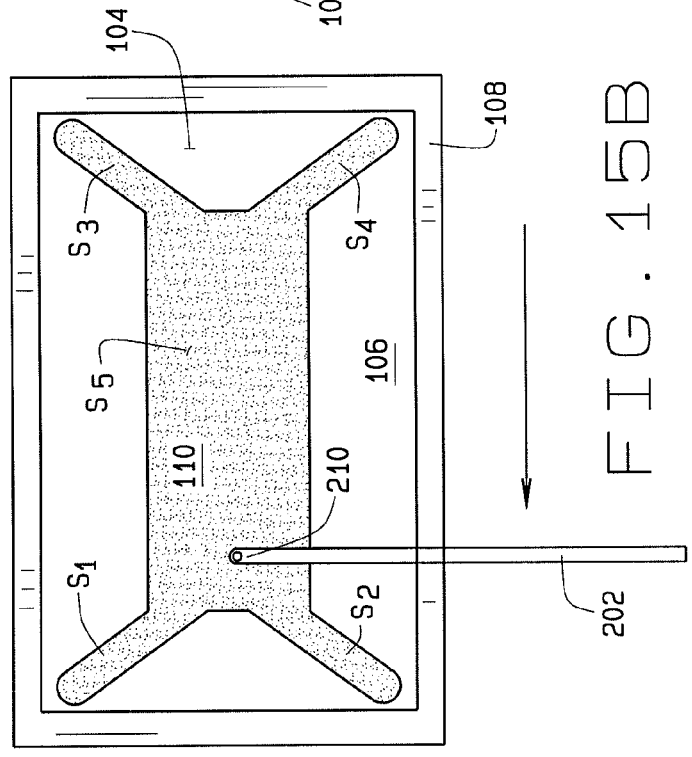

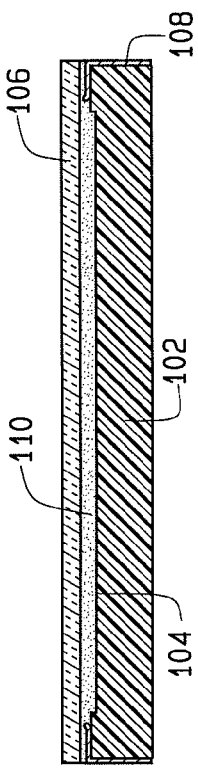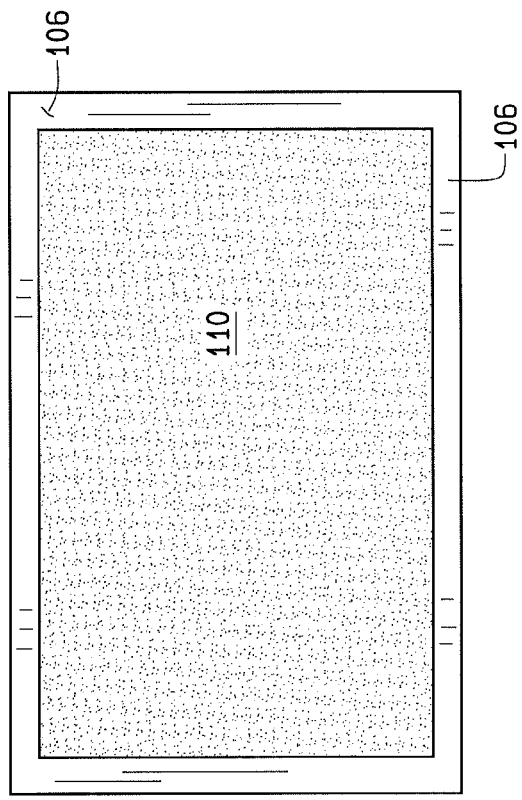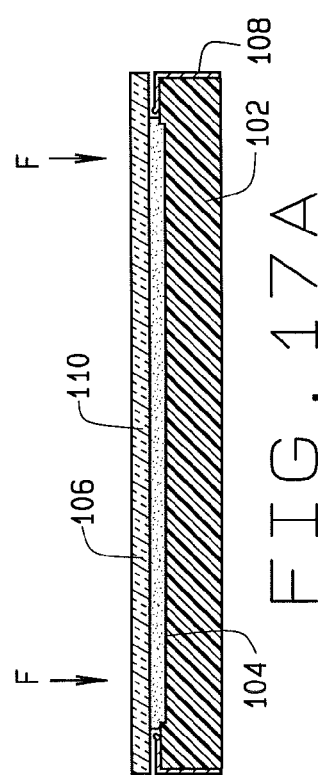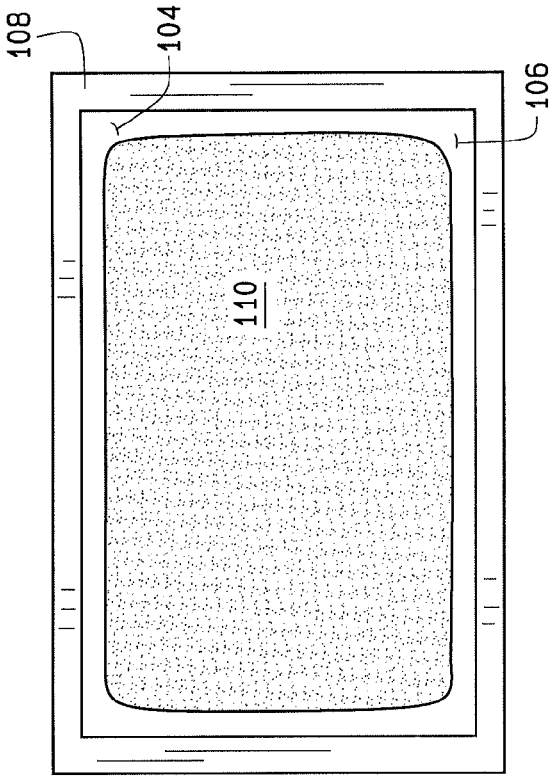

METHOD AND APPARATUS FOR LAYER BONDING OF DISPLAY ASSEMBLY

CROSS-REFERENCE TO RELATED APPLICATIONS

The present application is the United States National Stage under 35 U.S.C. 371 of International Application Serial No. PCT/US2009/048618, having an International Filing Date of Jun. 25, 2009. The present application is related to, and claims priority from, U.S. Provisional Patent Application Ser. No. 61/076,456 filed on Jun. 27, 2008, and U.S. Provisional Patent Application Ser. No. 61/114,682 filed on Nov. 14, 2008, both of which are herein incorporated by reference.

STATEMENT REGARDING FEDERALLY SPONSORED RESEARCH

Not Applicable.

BACKGROUND OF THE INVENTION

The present invention is generally related to methods and apparatus for the assembly of display panels such as liquid crystal display (LCD) devices, and in particular, to a method and apparatus for bonding one or more layers of glass, plastic, or other material of appropriate optical properties to a display module.

Display panels, such as liquid crystal display modules, are widely used in all parts of modern technology, including such areas as consumer electronics, computer equipment, industrial machinery controls, automobiles and aerospace applications. These display panels may include one or more layers of material disposed over the raw liquid crystal display module. For example, a protective overlay is most often desired for protection of the raw liquid crystal display module from mechanical and environmental forces. Raw display panes such as LCD modules, for example, usually have no protection for the top polarizer layer and the underlying glass layers. The protective overlay can provide additional features such as support for anti-reflective coatings which can enhance the display visibility under varying lighting conditions. Other layers of material which may be disposed over the raw liquid crystal display module include touch-sensitive panels, optical filers, heaters, and EMI shields.

Since this bonding process is for visible displays, the bonding layer which secures each layer of material must be transparent and completely free of optical defects such as entrapped dirt and air bubbles. Freedom from entrapped air bubbles are a particular advantage of the invention. Using traditional bonding techniques and apparatus, a bonding material such as an adhesive is utilized to secure a layer such as a protective overlay to a display module is applied in a bead first to only one surface, either the top surface of the display module or the underside of the protective overlay, followed by pressing another, un-wetted surface against the bead, and is likely to trap air bubbles when the second un-wetted surface first touches the bead of bonding material.

Accordingly, it would be advantageous to provide a method and apparatus for the bonding of one or more material layers to a display module surface which yields a resulting assembly which is transparent and completely free of optical defects such as entrapped dirt and air bubbles.

BRIEF SUMMARY OF THE INVENTION

Briefly stated, the present disclosure provides a method and apparatus for the bonding of one or more material layers to an exposed surface of a display module such as an LCD assembly, to produce a resulting assembly which is transparent and substantially free of optical defects such as entrapped dirt and air bubbles. During the bonding process of the present disclosure, a moving dispensing probe, or needle, dispenses a liquid bonding material between the exposed surface of the display module and the material to be bonded thereto over a pattern in a manner which continuously touches (wets) both the material layer and the display module surface simultaneously.

By simultaneously wetting both surfaces, and by dispensing the liquid bonding material in a predetermined pattern between the surfaces, the introduction of entrapped dirt and the formation of air bubbles is prevented as the two mating surfaces are subsequently pressed together.

The foregoing features, and advantages set forth in the present disclosure as well as presently preferred embodiments will become more apparent from the reading of the following description in connection with the accompanying drawings.

BRIEF DESCRIPTION OF THE SEVERAL VIEWS OF THE DRAWINGS

In the accompanying drawings which form part of the specification:

FIGS. 5A and 5B illustrate a side view and a top view (looking through the transparent material layer) of the relative positions of an bonding material dispenser, the assembled LCD, and a material layer forming a protective overlay prior to the application of a bonding material;

FIGS. 6A and 6B illustrate a side view and a top view (looking through the transparent material layer) of the relative positions of an adhesive dispenser, the assembled LCD, and the material layer forming a protective overlay as the bonding material is initially dispensed;

FIGS. 7A and 7B illustrate a side view and a top view (looking through the transparent material layer) of the relative positions of an bonding material dispenser, the assembled LCD, and the material layer forming a protective overlay as the bonding material is dispensed along a first segment;

FIGS. 8A and 8B illustrate a side view and a top view (looking through the transparent material layer) of the relative positions of an bonding material dispenser, the assembled LCD, and the material layer forming a protective overlay as the bonding material is dispensed along a second segment;

FIGS. 9A and 9B illustrate a side view and a top view (looking through the transparent material layer) of the relative positions of an bonding material dispenser, the assembled LCD, and the material layer forming a protective overlay as the bonding material dispenser is withdrawn from between the layers;

FIGS. 10A and 10B illustrate a side view and a top view (looking through the transparent material layer) of the relative positions of an bonding material dispenser, the assembled LCD, and the material layer forming a protective overlay as the bonding material dispenser is repositioned between the layers;

FIGS. 11A and 11B illustrate a side view and a top view (looking through the transparent material layer) of the relative positions of an bonding material dispenser, the assembled LCD, and the material layer forming a protective overlay as the bonding material is dispensed along a third segment;

FIGS. 12A and 12B illustrate a side view and a top view (looking through the transparent material layer) of the relative positions of an bonding material dispenser, the assembled LCD, and the material layer forming a protective overlay as the bonding material is dispensed along a fourth segment FIGS. 13A and 13B illustrate a side view and a top view (looking through the transparent material layer) of the relative positions of an bonding material dispenser, the assembled LCD, and the material layer forming a protective overlay as the bonding material dispenser is again withdrawn from between the layers;

FIGS. 14A and 14B illustrate a side view and a top view (looking through the transparent material layer) of the relative positions of an bonding material dispenser, the assembled LCD, and the material layer forming a protective overlay as the bonding material dispenser is repositioned for dispensing adhesive to the central region;

FIGS. 15A and 15B illustrate a side view and a top view (looking through the transparent material layer) of the relative positions of an bonding material dispenser, the assembled LCD, and the material layer forming a protective overlay as the bonding material dispenser applies the bonding material to the central region between the first through fourth previously applied segments;

FIGS. 16A and 16B illustrate a side view and a top view (looking through the transparent material layer) of the relative positions of an bonding material dispenser, the assembled LCD, and the material layer forming a protective overlay upon completion of the dispensation of the bonding material;

FIGS. 17A and 17B illustrate a side view and a top view (looking through the transparent material layer) of the relative positions of an bonding material dispenser, the assembled LCD, and the material layer forming a protective overlay as pressure is applied to uniformly distribute the bonding material between the layers;

FIGS. 18A and 18B illustrate a side view and a top view (looking through the transparent material layer) of the relative positions of an bonding material dispenser, the assembled LCD, and the material layer forming a protective overlay after application of pressure has fully dispensed the bonding material between the layers.

Corresponding reference numerals indicate corresponding parts throughout the several figures of the drawings. It is to be understood that the drawings are for illustrating the concepts set forth in the present disclosure and are not to scale.

Figure 1:
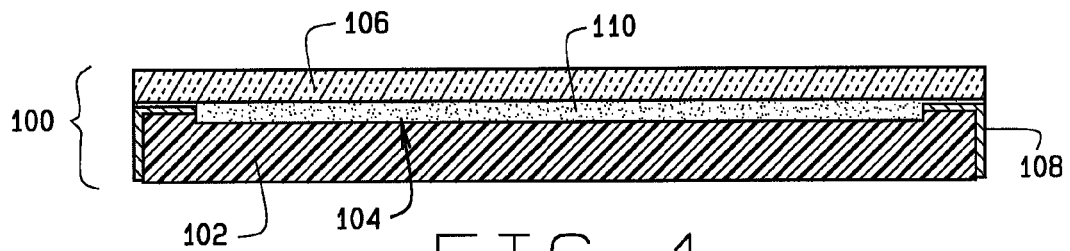
FIG. 1 is cross-section of an assembled LCD and a material layer forming a protective overlay assembled by methods of the present disclosure.

Before any embodiments of the invention are explained in detail, it is to be understood that the invention is not limited in its application to the details of construction and the arrangement of components set forth in the following description or illustrated in the drawings.

DETAILED DESCRIPTION

The following detailed description illustrates the invention by way of example and not by way of limitation. The description enables one skilled in the art to make and use the present disclosure, and describes several embodiments, adaptations, variations, alternatives, and uses of the present disclosure, including what is presently believed to be the best mode of carrying out the present disclosure. Various aspects of the present disclosure are set forth and described in association with an LCD module, but those skilled in the art will recognize the wider range of application for the methods and apparatus set forth herein, and that such applications are not limited to LCD modules, but rather, may be utilized in many environments wherein one or more material layers are required to be bonded to a display panel or other surface in an optically transparent and uniform manner. For example, the method and apparatus of the present invention may be utilized to provide bonding of one or more material layers such as touch panels, optical filters, heaters, EMI shields, or protective overlays to the surfaces of display modules which utilize plasma technology, vacuum fluorescent technology (CRT's), and LED technology as well as LCD modules.

Figure 2:
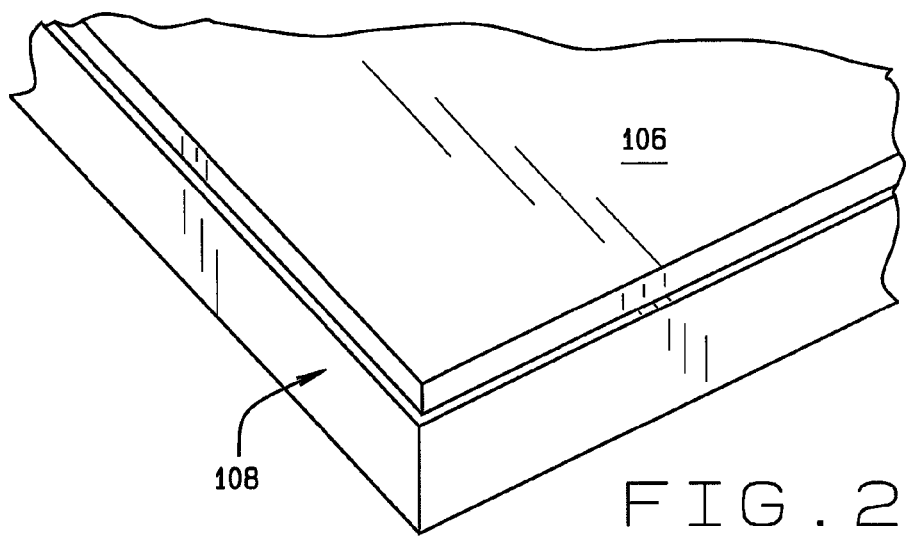
FIG. 2 is a perspective view of a portion of the assembled LCD and the protective overlay of FIG. 1.
Figure 3:
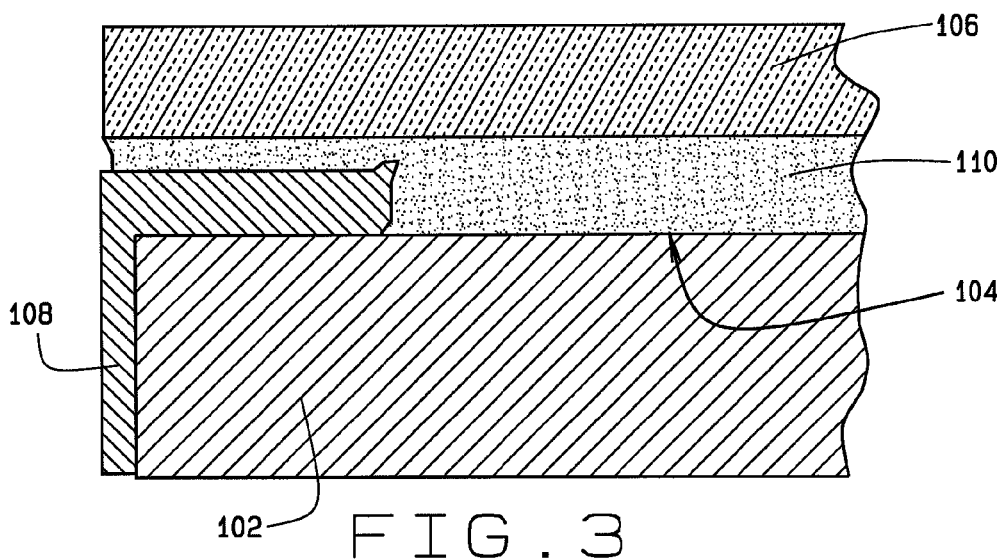
FIG. 3 is an enlarged portion of the cross-section of FIG. 1.

Turning to the figures, and to FIGS. 1-3 in particular, a bonded assembly 100 manufactured according to the methods of the present disclosure is shown generally. The bonded assembly 100 consists of an assembled display panel 102, such as an LCD module having an active display or LCD region 104 onto which has been bonded an one or more layers of material 106, such as a touch panel, an optical filter, a heater, an EMI shield, or an optically transparent protective overlay. The bonded assembly 100 may optionally further include a framework 108 surrounding the perimeter of the LCD module 102, as well as other device frames or supporting structures as required for the particular application in which the bonded assembly 100 is to be utilized. The material 106 may overlap a portion of the framework 108 to ensure a uniformly smooth upper surface to the bonded assembly 100. Those of ordinary skill will recognize that the characteristics of the material layers may be selected according to the application requirements of the bonded assembly 100, and may include desired optical properties, material strengths, glare or glint optical properties, and scratch resistant properties as required. One suitable material which may be utilized is an optical glass. As best seen in FIGS. 1 and 3, the material layers 106 may be bonded directly to the surface of the LCD module 102 over the active LCD region 104, or optionally to the surface of another material layer (not shown) previously bonded to the LCD module 102, by a layer of substantially uniform bonding material 110 which is free from entrapped air bubbles, unbonded regions, and contaminates.

Figure 4:
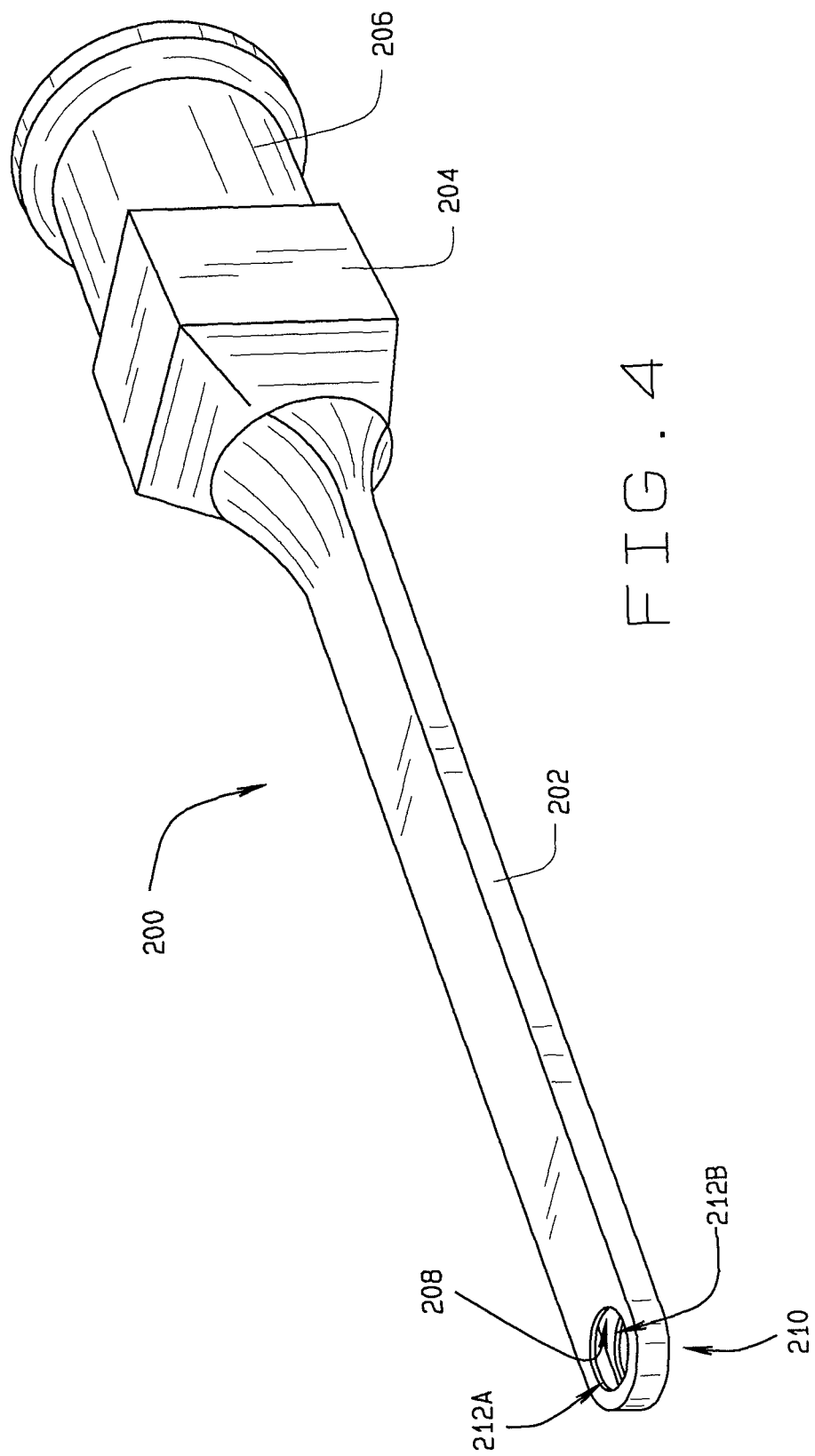
FIG. 4 is a perspective illustration of a liquid bonding material dispenser of the present disclosure.

To ensure the bonding material 110 is applied uniformly between the surfaces to be bonded, an bonding material dispenser 200, such as shown in FIG. 4 is utilized. The bonding material dispenser 200 as shown consists generally of an elongated and flattened neck 202 extending from a base coupling 204. The base coupling is configured with a suitable adapter 206 to be operatively connected to a dispenser (not shown) for a supply of liquid bonding material 110 (adhesive) which is dispensed to the base coupling 204 at a controlled rate of flow. The bonding material 110 flows through an internal passage 208 within the flattened neck to a dispensing tip 210. The dispensing tip 210 of the flattened neck includes dispensing openings 212A and 212B on both an upper and lower surface, which enable the flow of bonding material 110 to disperse from the internal passage 208 and out the dispensing tip 210 in two directions simultaneously. Those skilled in the art will recognize that the specific configuration of the bonding material dispenser 200 may be varied from that shown in FIG. 4, depending upon the particular application in which it is to be utilized. For example, the neck portion 202 may have different geometry, and the dispensing tip 210 may include a varied number of dispensing openings 212, positioned as required to achieve the desired flow rate and flow uniformity of the bonding material 110 as it is dispensed there from.

During a bonding operation, the material layer 106 to be bonded to the LCD module 102 is positioned and held in close proximity to the surface 104 of the LCD module or to a previously bonded material layer (not shown), but is separated there from by a uniform air gap 300, as shown in FIGS. 5A and 5B. Next, the elongated and flattened neck portion 202 of the bonding material dispenser 200 is moved into the air gap 300 between the material layer 106 to be bonded and the surface 104 of the LCD module 102 (or previously bonded material layer) to an initial predetermined position at which the bonding material 110 will be initially introduced. The dispensing of the bonding material 110 is controlled in a way that allows beads of bonding material 110 emerging from the dispensing tip 210 to touch each of the opposing mating surfaces simultaneously and continuously as the dispensing tip 210 is subsequently moved in a predetermined pattern between the surfaces. Preferably, the predetermined pattern is selected to ensure that the proper amount of bonding material 110 is dispensed between the surfaces, and that the bonding material 110 uniformly disperses without trapping air bubbles or excessive overflow. Those of ordinary skill will recognize that while FIGS. 5A through 18B illustrate the positioning and placement of a material layer 106, such as a protective overlay, over an LCD module 102 from above, the process of the present disclosure may be carried out in different orientations as may be required to facilitate assembly. For example, the process may be implemented by positioning the LCD module 102 above the material layer 106, and lowering it downward thereon during the bonding procedure.

In one embodiment of the present disclosure, a predetermined pattern for dispensing the bonding material 110 between the surfaces, such as between a protective overlay material layer 106 and the LCD surface 104 is illustrated in FIGS. 6A through 16B. The predetermined pattern consists generally of four linear segments S1, S2, S3, and S4 of bonding material applied between the layers 106, 104 to form a pair of inwardly directed chevrons (FIG. 13B). A fifth segment S5 of bonding material 110 is then applied as shown in FIG. 15B to connect the apexes of each chevron across the central region surfaces, after which the bonding material dispenser 200 is withdrawn from between the layers (FIG. 16B).

Once the bonding material 110 has been uniformly applied between the surfaces of the material layers 104, 106 in the predetermined pattern, and the bonding material dispenser 200 withdrawn, a uniform compressive force F is applied to the assembled layers, as shown in FIGS. 16A and 17A to urge the material layer 106 to be bonded towards the surface 104 of the LCD module 102. As the compressive force F is applied (FIGS. 17A and 17B), the bonding material 110 flows from the dispenses segments S1-S5 between the layers 104, 106 and uniformly disperses there between (FIGS. 18A and 18B). Wetting and capillary forces as well as the precisely calculated amount of bonding material 110 that is utilized in the predetermined pattern, and the pressed alignment, ensure an uniform bonding layer between the LCD display 102 and each material layer 106. Subsequent hardening or curing of the bonding material 110 by any suitable means, such as a high intensity ultraviolet light source, finalizes the process of bonding the material layer 106 to the surface 104 of the LCD module 102 or to the surface of a previously bonded material layer (not shown).

It will be recognized that the predetermined pattern in which the bonding material 110 is delivered between the layers to be bonded may be varied depending upon the various flow characteristics of the bonding material 110, the size of the region to be bonded, and the desired thickness of the bond.

Figure 19:
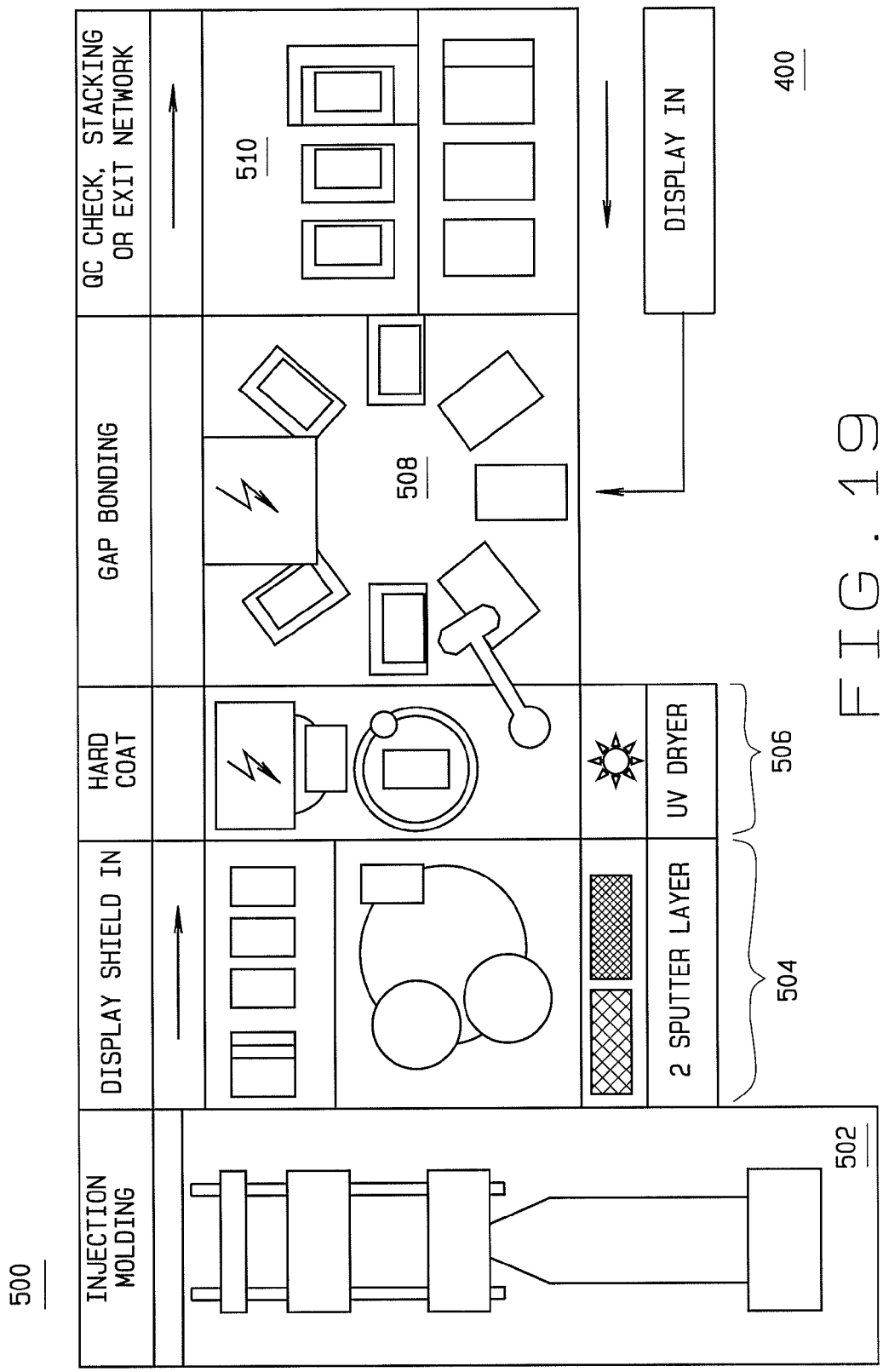
FIG. 19 is a representation of an exemplary assembly line configuration for assembling and bonding LCDs with one or more material layers according to the present disclosure.

Those of ordinary skill in the art will further recognize that the bonding process of the present disclosure may be incorporated into an assembly line for the manufacture of the bonded display panels 100 or LCD assemblies, such as shown in FIG. 19. For example, as seen in FIG. 19, the apparatus for performing the bonding process of the present disclosure may be disposed at the juncture of an assembly line 400 which delivers individual LCD modules 102 and an assembly line 500 which delivers the material layers 106 to be bonded thereto, i.e., protective overlays. In one exemplary system, the protective overlays may be manufactured by an injection molding process (Box 502), receive one or more layers of a desired optical coating, such as by sputtering techniques (Box 504), which is then hardened (such as by UV light) (Box 506) prior to delivery to the bonding apparatus (Box 508) wherein they are joined with individual LCD modules 102. The finished bonded assemblies 100 are then distributed to a quality control check station (Box 510), packing station, or subsequent step in a manufacture of a finished product.

The present disclosure can be embodied in-part in the form of computer-implemented processes and apparatuses for practicing those processes. The present disclosure can also be embodied in-part in the form of computer program code containing instructions embodied in tangible media, such as floppy diskettes, CD-ROMs, hard drives, or an other computer readable storage medium, wherein, when the computer program code is loaded into, and executed by, an electronic device such as a computer, micro-processor or logic circuit, the device becomes an apparatus for practicing the present disclosure.

The present disclosure can also be embodied in-part in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the present disclosure. When implemented in a general-purpose microprocessor, the computer program code segments configure the microprocessor to create specific logic circuits.

As various changes could be made in the above constructions without departing from the scope of the disclosure, it is intended that all matter contained in the above description or shown in the accompanying drawings shall be interpreted as illustrative and not in a limiting sense.

The invention claimed is:

1. A method for bonding one or more material layers to a display panel, each of the material layers having at least one substantially flat surface and the display panel having at least one substantially flat bonding surface, the method comprising:

selecting a dispenser adapted to dispense liquid bonding material between one of said one or more material layers and the display panel, the dispenser having a tip comprising a first dispensing opening and a second dispensing opening substantially opposite the first, the dispensing openings adapted to dispense the liquid bonding material from the dispenser;

selecting the liquid bonding material to dispense through the dispensing openings of the bonding material dispenser;

selecting a flow rate to dispense the liquid bonding material through the dispensing openings of the dispenser;

positioning a substantially flat first surface of one of said one or more material layers opposite and substantially parallel to a substantially flat bonding surface of the display panel, said surfaces separated from one another by a substantially uniform air gap;

positioning the bonding material dispenser at a predetermined position within said uniform air gap, and orienting the dispenser tip such that the first dispensing opening is directed at least in part to the first surface of the material layer and the second dispensing opening is directed at least in part to the bonding surface of the display panel;

further orienting the dispensing openings of the bonding material dispenser such that upon initial dispensing, the liquid bonding material will contact the first surface of the material layer and the bonding surface of the display panel substantially simultaneously;

dispensing the predetermined bonding material from the dispenser through the openings at the predetermined flow rate;

withdrawing the dispenser from the air gap upon completion of the liquid bonding material dispensation; and curing the dispensed liquid bonding material to bond the material layer to the display panel.

2. The method of claim 1, further comprising the step of dispensing the liquid bonding material from the dispenser as the dispenser is moved through a predetermined pattern within said air gap, the bonding material contacting the first surface of the material layer and the bonding surface of the display panel substantially simultaneously during dispensation.

3. The method of claim 2, further comprising the step of withdrawing the dispenser from the air gap upon completion of the predetermined pattern of adhesive dispensation.

4. The method of claim 1, further comprising the step of applying a uniform compressive force to urge the material layer and the display panel together, entrapping the liquid bonding material in a uniform layer therebetween, prior to the step of curing the liquid bonding material.

5. The method of claim 1, further comprising the step of positioning the first surface of the one of said one or more material layers substantially parallel to the bonding surface of the display panel, said surfaces separated from one another by a substantially uniform air gap, prior to the step of dispensing the liquid bonding material through the dispenser.

6. The method of claim 1, wherein the dispensing openings are adapted to discharge the liquid bonding material in opposite directions from one another.

7. The method of claim 1, wherein the dispenser has a neck portion that has an elongated and flattened configuration.

8. The method of claim 1, wherein the first and second dispensing openings are of substantially uniform size.

9. The method of claim 1 wherein the material layer comprises a protective overlay.

10. The method of claim 1 wherein the bonding surface of the display panel surface comprises at least one layer of material previously bonded to the display panel.

11. The method of claim 1 further including, subsequent to the curing step, the steps of:

positioning a second material layer in alignment over the bonded material layer, the second material layer separated from the bonded material layer by a second substantially uniform air gap;

selecting a second liquid bonding material to dispense through the dispensing openings of the bonding material dispenser;

selecting a flow rate to dispense the second liquid bonding material through the dispensing openings of the dispenser;

positioning the dispenser at a predetermined position within the second air gap, and orienting the dispenser tip such that the first dispensing opening is directed to the second material layer and the second dispensing opening is directed to the bonded material layer;

further orienting the dispensing openings of the dispenser such that upon initial dispensing, the second liquid bonding material will contact the second material layer and the bonded material layer substantially simultaneously;

dispensing the second liquid bonding material from the dispenser at the predetermined flow rate through the dispensing openings;

withdrawing the dispenser from the second air gap upon completion of the second liquid bonding material dispensation; and curing the dispensed second liquid bonding material to bond the material layer to the display panel.

12. The method of claim 11, further comprising the step of applying a second uniform compressive force to urge the second material layer and the bonded material layer together, entrapping the second bonding material in a uniform layer therebetween.

13. The method of claim 12, wherein both bonding layers are cured at the same time.

14. The method of claim 1, wherein said steps of position, positioning, dispensing, withdrawing, applying, and curing are repeated for each material layer in the bonded display assembly.

15. The method of claim 1, wherein the material layer is selected from a set of material layers including a touch panel, an optical filter, a heater, an EMI shield, and a protective overlay.

* * * * *